Patented Jan. 2, 1940

2,185,368

UNITED STATES PATENT OFFICE 2,185,368

PROCESS OF MAKING A POTATO STARCH PRODUCT

William Spencer Bowen, Westfield, N. J.

No Drawing. Application July 7, 1937,
Serial No. 152,369

6 Claims. (Cl. 99—91)

This invention relates to starch-containing products having valuable yeast activating and flour improving properties and to processes for making the products.

Various salts or mixtures of the same are commonly used in the baking industry as yeast activators and strengtheners for the gluten in flour. A typical flour improving mixture of salts is disclosed in the Sullivan Patent No. 1,630,143, patented May 24, 1927, and consists of 50% mono-calcium dihydrogen phosphate, 25% ammonium chloride, 25% calcium sulphate, and a fraction of a percent of iron, manganese or zinc sulphate. Such flour improvers as that disclosed in the Sullivan patent indirectly improve the quality of baked goods, their principal function being to improve the action of ingredients normally present in the flour or dough. The presence of salts in the baked products, otherwise has little, if any, effect on the quality of the product; that is, the salts are added to regulate the hydrogen ion concentration to an optimum condition for yeast activity or fermentation, and their presence or absence in the final product is immaterial.

The principal object of this invention is to produce a flour improver which makes yeast more active, strengthens the gluten in the flour and in addition, improves the color of the crust, and aids in retaining moisture in the baked product.

A still further object of the invention is to devise a process whereby a flour improver may be produced which when used with flour, greatly facilitates the production of bakery products and produces baked products of improved quality.

The process may consist of cooking starch-containing materials to partially gelatinize the starch content thereof. To the cooked product may then be added a slightly acid mixture of edible salts capable of causing dextrinization of the gelatinized starch. After the starch has been treated and mixed with the edible salts, the mixture may be dried in any suitable way, such as for example, by spray drying or drying on a drum.

The salts utilized in the product preferably comprise a mixture of mono-calcium phosphate, calcium sulfate, ammonium chloride and sodium chloride in such proportions as to produce upon dissolving a slightly acid solution. The proportions of these salts in the mixture can be varied somewhat, but preferably are used in about the proportions indicated in the specific example later described. Also, other edible salts known to have yeast-activating and flavor-improving properties may be added to the mixture, if desired.

The final product consists of a powdery mixture of starch, food salts and dextrin, and other ingredients which are normally present in the starchy material.

A typical example of the process for making the flour improver is as follows: Potatoes are boiled or steamed to thoroughly cook them, causing partial gelatinization of the starch content thereof. The cooking step may be carried out with a continuous cooker which delivers the cooked potatoes to a mechanism for peeling them. The peeled potatoes are then delivered to a pot or a vat containing a solution of edible salts. A mixture of salts which has proven extremely satisfactory consists of:

| | Per cent by weight |
|---|---|
| Mono-calcium phosphate | 62 |
| Calcium sulphate (containing 2 molecules of water) | 10 |
| Ammonium chloride | 8 |
| Sodium chloride | 20 |

This mixture of salts is dissolved in a small quantity of water and delivered to the vat in the proportions of about 1 part by weight of the mixture of salts to 7 parts by weight of the potatoes. The ingredients are thoroughly mixed by means of a mechanical stirrer at a temperature between about 160° and about 200° F. until the mixture is reduced to a smooth paste or liquid, depending upon the quantity of water present in the mixture. The water content may be varied considerably depending upon the type of drying operation to which the mixture is subjected. For spray-drying, the mixture preferably is in a semi-liquid state. The semi-liquid mixture is delivered to a spray drying mechanism and is sprayed by means of a homogenizing atomizer downwardly into a stream of hot air, whereby the mixture is dried as it descends toward the bottom of the spray drying chamber. The hot air may be delivered to the spray drying chamber at a temperature between 400° and 500° F. The starch in the mixture during the agitation and during drying in the presence of slightly acid mixture of edible salts is partially dextrinized.

The dried product is a cream colored powder containing the food salts above mentioned. Due to the light color of the product, it may be utilized to advantage with white flour or whole wheat in the manufacture of bread and other bakery products. The salts are edible and aid in seasoning the baked goods as well as providing a source of calcium in easily assimulable form.

I have found that a suitable mixture of wheat flour and the flour improver consists of about 96% flour and 4% flour improver by weight.

The presence of the dextrin in the product gives bread, upon baking, a desirable brown colored crust. The dextrin, also, is somewhat hygroscopic and tends to retain moisture in the baked products.

The edible salts present in the flour improver maintain the flour improver and the flour in a slightly acid condition. This has been found to be the optimum condition for baking processes. The presence of a slightly acid mixture stimulates the yeast, accelerating fermentation which causes an increased amount of carbon dioxide to be released. This results in an increase in the rapidity as well as the amount that the dough rises. The salts also have a toughening or maturing effect on the gluten of the flour, increasing the tenacity of the dough structure. This results in the formation and retention of a greater number of gas cells and increases the volume of the baked product without decreasing the quality or texture of the product.

It will be seen from the foregoing that I have produced a highly desirable type of bread improving product which utilizes readily available starting materials and which has desirable characteristics for aiding in the production of baked goods.

It should be understood that the example given as a typical form of the invention may be varied as desired, such as by using starch-containing products other than potatoes as a starting material, and by varying the proportions and composition of the ingredients making up the mixture of edible salts, without departing from the invention. Therefore, the above described procedure should be considered as illustrative only and not as limiting the scope of the following claims.

I claim:

1. The process of making a dextrinized bread improving starch composition comprising cooking starchy material to partially gelatinize the starch, mixing the cooked material with a slightly acid solution containing mono-calcium phosphate, calcium sulphate and ammonium chloride, heating the mixture to partially dextrinize the starch and drying the mixture.

2. The process of making a dextrinized bread improving starch composition comprising cooking starchy material to partially gelatinize the starch, mixing about seven parts by weight of the cooked material with about one part by weight of a slightly acid mixture of mono-calcium phosphate, calcium sulphate, ammonium chloride and sodium chloride, heating the mixture to dextrinize the starch and drying the mixture.

3. The process set forth in claim 1 in which the mixture of salts consists of 62% by weight of mono-calcium phosphate, 10% by weight of calcium sulphate, 8% by weight of ammonium chloride and 20% by weight of sodium chloride.

4. The process set forth in claim 2 in which the mixture of salts consists of 62% by weight of mono-calcium phosphate, 10% by weight of calcium sulphate, 8% by weight of ammonium chloride and 20% by weight of sodium chloride.

5. The process of making a dextrinized bread improving starch composition comprising cooking potatoes to partially gelatinize the starch, mixing the cooked potatoes with a slightly acid solution of mono-calcium phosphate, calcium sulphate, ammonium chloride and sodium chloride and drying the mixture.

6. The process of making a dextrinized bread improving starch composition comprising cooking potatoes, removing the skins, mixing about seven parts of the peeled potatoes with about one part of a slightly acid mixture of mono-calcium phosphate, calcium sulphate, ammonium chloride and sodium chloride to partially dextrinize the potato starch and drying the mixture.

WILLIAM SPENCER BOWEN.